INVENTORS
R. B. LESHER
C. E. GREENE

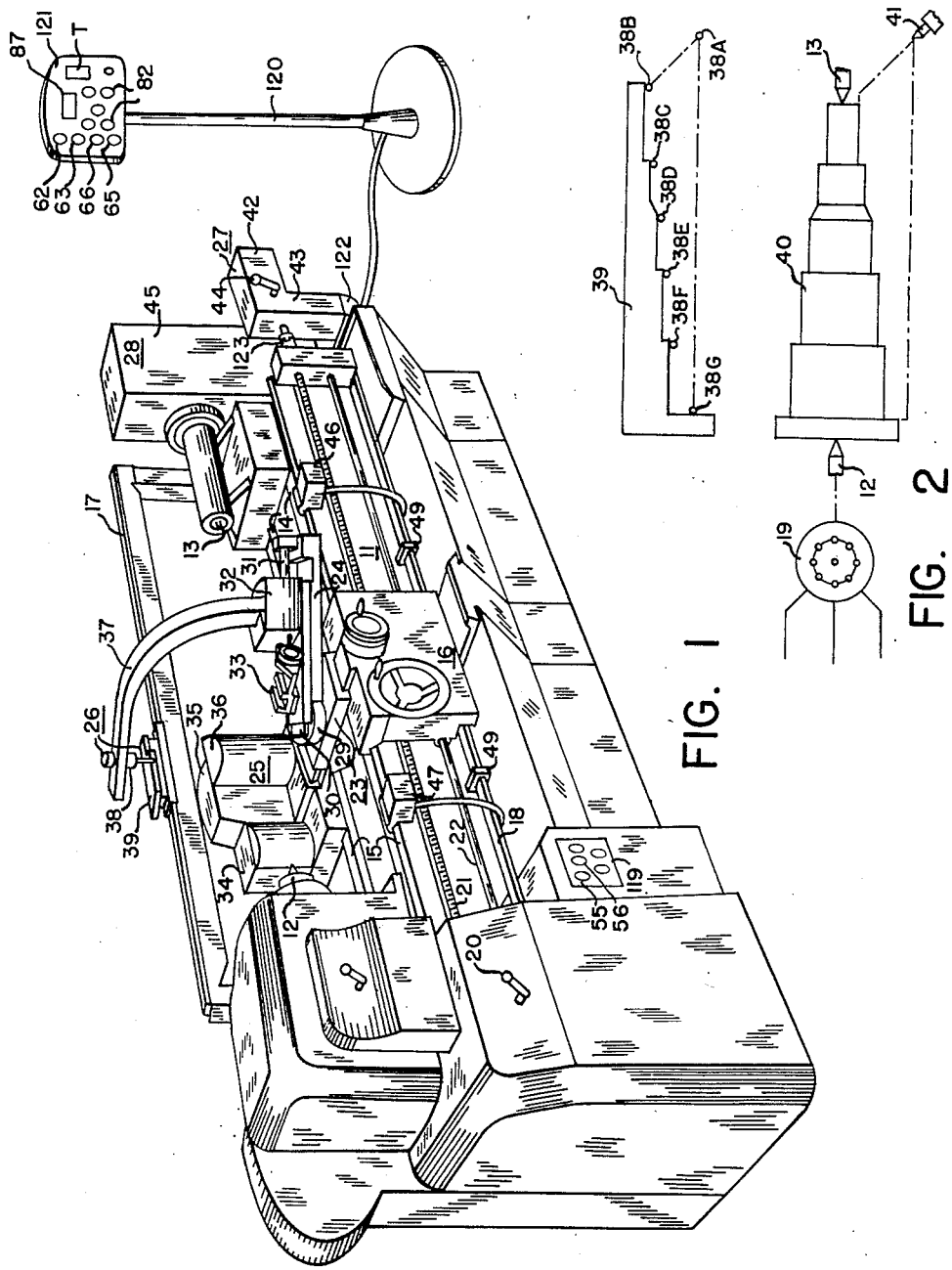

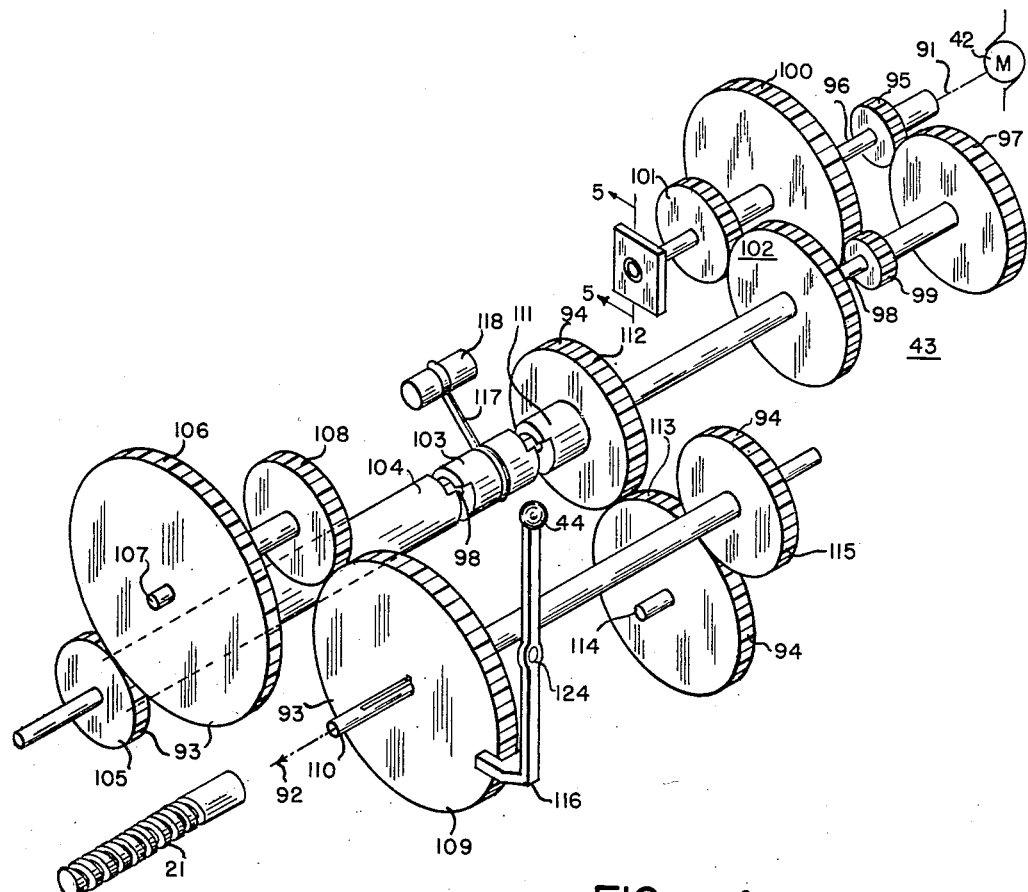

United States Patent Office 2,814,007
Patented Nov. 19, 1957

2,814,007

AUTOMATIC CYCLE MACHINE TOOL

Robert B. Lesher and Claude E. Greene, Sidney, Ohio, assignors to The Monarch Machine Tool Company, a corporation of Ohio Application March 8, 1950, Serial No. 148,431

4 Claims. (Cl. 318—39)

The invention relates in general to controllable drive units and more particularly to such controllable drive units which may be manufactured as a separable package unit for converting a standard machine tool, such as a lathe, into an automatic cycle machine.

An object of the invention is to provide a separable package unit for a machine tool which has a tracer and pattern controlled slide and another slide driven by a motor wherein movements of both slides may be controlled by a control system.

Another object of the invention is to provide a controllable drive unit for a machine tool wherein a first slide is powered by a first motor under control of a tracer and pattern assembly and a second slide is driven by a second motor with a control system which may control both motors during at least a portion of an automatic cycle with the control system rendering dominating control to the first motor which renders the tracer and pattern assembly inoperative to control the first motor.

Another object of the invention is to provide a movable slide on a machine tool with electrical switches to effect operation of a control system which controls the movement of the slide to establish different speeds of movement of the slide in opposite directions of reciprocation thereof. Further, the slide may be provided with variable rates of movement during its travel in one direction by the actuation of such electrical switches. This variable feed rate of the slide may profitably be used to break up the chips of the metal being removed in the event that they are not breaking properly.

Another object of the invention is to provide a machine tool slide with a high speed electric motor of small size which has relatively small inertia and to step down the speed through a speed reducing drive which includes gears mounted on ball bearings, thus eliminating as much friction as possible to create a rapidly controllable slide which may be changed from one speed to another in a minimum of time.

Another object of the invention is to provide a separable package unit which may be attached to a standard lathe and used to convert this lathe into an automatic cycle machine wherein the separable package unit includes a high speed electric motor and a ball bearing mounted gear box which may be attached to the lead screw of the lathe for driving same and wherein the cross slide is powered by a servomotor under the control of a pattern and tracer assembly with both motors being controlled by a control system actuated by electric switches which may take control of the cross slide motor from the tracer assembly during the return stroke of the carriage and cross slide.

Other objects and a fuller understanding of the invention may be had by referring to the following description and claims, taken in conjunction with the accompanying drawings, in which:

Figure 1 is a general perspective view of a lathe incorporating the separable package unit as a controllable drive for the carriage and cross slide of a lathe;

Figure 2 is a diagrammatic plan view of a pattern and tracer assembly used to control the movements of a tool relative to a workpiece;

Figure 4 is an isometric view of the speed reducing drive used as part of the power train from the carriage motor to the carriage; and Figure 5 is a sectional view taken on the line 5—5 of Figure 4 and showing the details of construction of the ball bearing mounted gears.

Figure 3:
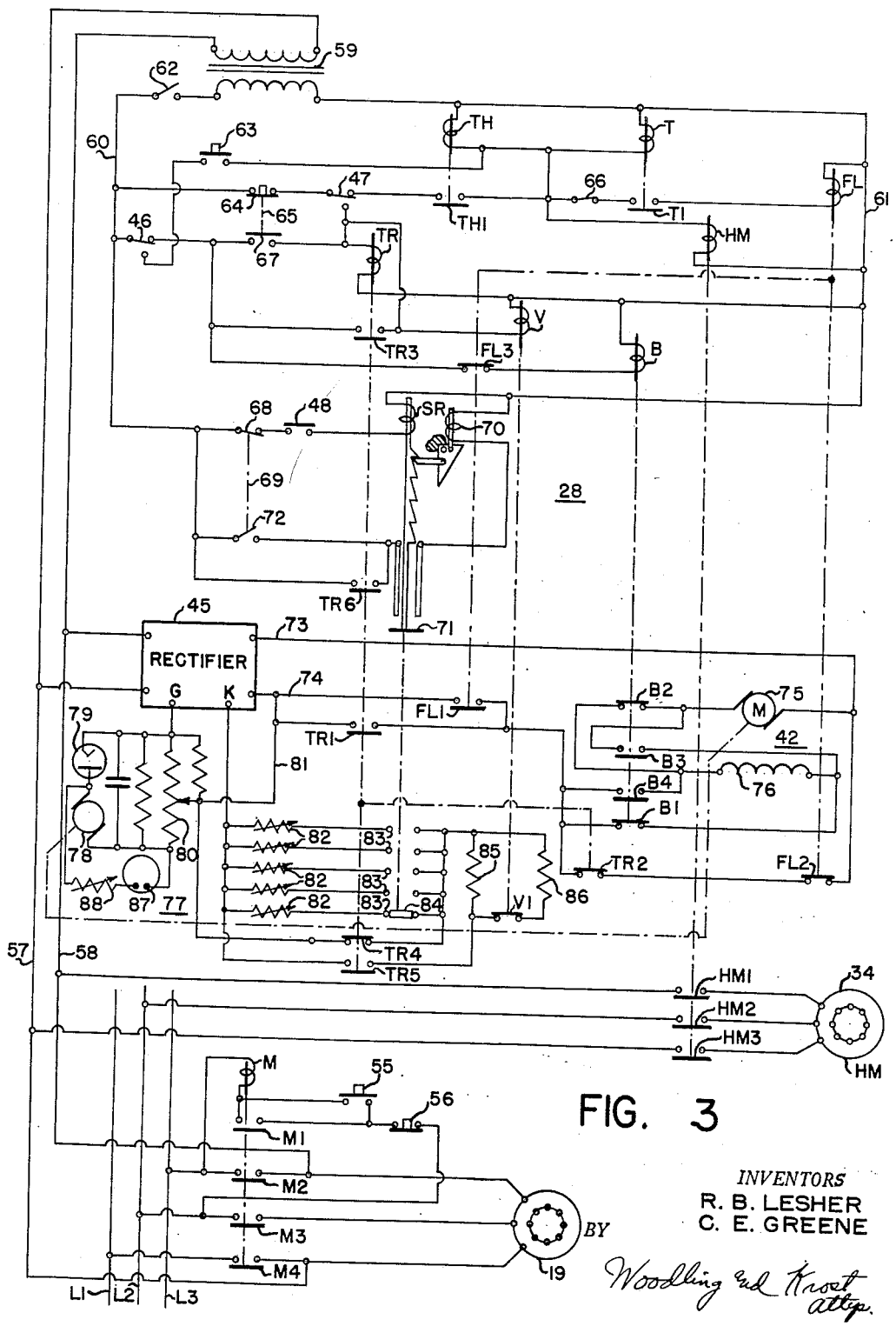
Figure 3 is a schematic wiring diagram of the circuit used in the control system of the separable package unit.

The Figure 1 shows a lathe having a bed 11 carrying a spindle 12 and a tailstock 13 for supporting a workpiece 40, not shown in Figure 1 for clarity, but shown in Figure 2. The tailstock 13 rides on ways 14 and the bed is additionally provided with carriage ways 15 for slidably supporting a carriage 16. The bed is provided with a back rail 17 and a front rail 18. The spindle 12 may be driven by a spindle motor 19, Figures 2 and 3, and a customary gear box with a manual lever 20 may be provided for reciprocating the carriage 16 from the spindle motor 19 through the agency of a lead screw 21. A conventional feed rod 22 is provided for driving a cross slide 23. The separable package unit which may be used as a controllable drive unit for the lathe, shown in Figure 1, comprises generally a top slide 24, a hydraulic power unit 25 for powering this top slide 24, a pattern and tracer assembly 26 for controlling the hydraulic power unit 25, an electrical power unit 27 for driving the carriage 16 and an electrical control system 28 for controlling the operation of the electrical power unit 27 and also the top slide 24 through at least a portion of an automatic cycle. The top slide 24 is shown as being pivotally mounted to the cross slide 23 by the pivot 29 and being reciprocable on ways 30. This top slide has a piston, not shown, fastened to a piston rod 31 which in turn is fixedly fastened to the top slide ways 30. A cylinder 32 forms with the piston a hydraulic servomotor for reciprocating the top slide 24 and the entire cylinder 32 is movable. Mounted on the top slide 24 is a tool slide 33 for carrying a tool 41, shown in Fig. 2.

The hydraulic power unit 25 is mounted upon the carriage 16 and comprises an electric motor 34, a hydraulic pump 35 and a sump 36. The hydraulic pump supplies hydraulic fluid to the cylinder 32 for reciprocation of the top slide 24. An arm 37 is rigidly fastened to the top slide 24 and extends upwardly and rearwardly to a position near the back rail 17. This arm 37 carries a tracer assembly 38 and the back rail 17 carries the pattern assembly 39. The pattern and tracer assembly cooperate to control the hydraulic power unit 25 and thus control movements of the top slide 24. The matter of operation is similar to the application of K. T. Kuck, Ser. No. 120,250, filed October 8, 1949, now abandoned.

The electrical power unit 27 includes generally a carriage motor 42 and a speed reducing drive 43 which interconnects the carriage motor 42 and the right end of the lead screw 21. The speed reducing drive 43 has a manual shift lever 44 for connecting or disconnecting the lead screw 21 from the speed reducing drive 43. The electrical control system 28 includes a rectifier 45 for supplying rectified electrical energy to the carriage motor 42, right and left limit switches 46 and 47 and a feed varying switch 48, shown in Figure 3, which may be actuated by a plurality of dogs 49 mounted on the front rail 18.

Figure 3 shows the electrical control system 28 which is powered generally from the three phase electrical supply lines L1, L2 and L3. A main relay M is connected by a start button 55 across the lines L2 and L3 with a stop button 56 also being connected in this series circuit to de-energize the main relay M. Contacts M1 are hold in contacts for this main relay M. Normally open contacts M2, M3 and M4 upon closing are adapted to energize the spindle motor 19. Leads 57 and 58 are also energized upon closing of the contacts M2 and M4. The hydraulic pump motor 34 is connected across the three phase lines 57, L2 and 58 through the three normally open contacts HM1, HM2 and HM3.

Connected across the leads 57 and 58 is a control transformer 59 which in turn supplies energy to control leads 60 and 61 through a control switch 62. A timer relay T and a timer hold in relay TH are connected across the control leads 60 and 61 through a start cycle switch 63 and the normally open contacts of the single pole double throw right limit switch 46. Normally open contacts TH1 of the timer hold in relay TH bypass the start cycle switch 63 to maintain the timer and timer hold in relays energized upon release of this start cycle switch button. The timer hold in contacts TH1 are connected to the control lead 60 through the upper contacts 64 of a reversing switch 65 and through the upper normally closed contacts of the double throw single pole left limit switch 47. In parallel with the timer relay T is the series combination of a feed left relay FL, normally open timer relay contacts T1 and a stop cycle switch 66. Further in parallel with this timer relay T is a hydraulic motor relay HM. A traverse right relay TR is connected across the control leads 60 and 61 through the lower, normally open contacts of the left limit switch 47 and the upper contacts 64 of the reversing switch 65. Further this traverse right relay TR may be connected to the control lead 60 through lower contacts 67 of this reversing switch 65 and the upper contacts of the right limit switch 46. Hold in contacts TR3 are provided for the traverse right relay TR. A second timer relay V is connected in parallel with the traverse right relay TR. A brake relay B is connected across the control leads 60 and 61 through normally closed contacts FL3 of the feed left relay FL and the upper contacts of the right limit switch 46. A stepping relay SR is connected across the control leads 60 and 61 through the normally open feed varying switch 48 and through the upper contacts 68 of a cut-out switch 69. The stepping relay SR has a release coil 70 which may be energized from the control leads 60 and 61 through reset contacts 71 of the stepping relay SR and the lower contacts 72 of the cut-out switch 69. Paralleling the lower contacts 72 are the normally open contacts TR6 of the traverse right relay TR.

The rectifier 45 is connected across the leads 57 and 58 as the input to this rectifier and the output is supplied across leads 73 and 74. Control terminals G and K are provided on this rectifier 45 for establishing a voltage thereacross which in turn controls the output of the rectifier 45. These terminals G and K may be the connections to the grid and cathode respectively, of a controllable thermionic rectifier. Such rectifier may be that such as shown in the copending application of Claude E. Greene, Ser. No. 737,931, filed March 28, 1947, now Patent No. 2,609,524. The output from the rectifier 45 is adapted to energize the carriage motor 42 which comprises an armature 75 and a field 76. The brake relay B has four contacts, two of which, B1 and B2, are normally closed to connect the armature 75 and field 76 in series across the leads 73 and 74 in conjunction with either of the paralleled normally open contacts FL1 or TR1. Normally open contacts B3 and B4 of the brake relay B are adapted to reverse the connection of the field 76 relative to the armature 75 for a reverse rotational direction of the carriage motor 42. A dynamic braking circuit shorts the field 76 across the armature 75 and includes the serially connected normally closed contacts TR2 and FL2 of the traverse right and feed left relays, respectively. A biasing circuit 77 is connected to the control terminals G and K and includes a tachometer generator 78 connected to the carriage motor 42 which generator develops a voltage proportional to the motor speed. This voltage is rectified by the rectifier tube 79 and appears across a compensating potentiometer 80. Connected across the tachometer generator 78 is the series combination of a feed meter 87 and a meter adjustment potentiometer 88 with this meter 87 calibrated in units to show the rate of feed of the carriage 16 in inches per minute. A tie-in lead 81 is provided between the compensating potentiometer 80 and the rectifier output lead 74 to establish a reference potential. A plurality of feed potentiometers 82 are provided to establish different biasing voltages across the terminals G and K and these feed potentiometers 82 are paralleled each being in series with one of a plurality of contacts 83 of the stepping relay SR. A contact blade 84 of the stepping relay SR is adapted to make successive connection with the plurality of contacts 83 to thus successively place into the biasing circuit 77 another one of the feed potentiometers 82. A shifting resistance 85 is connected in the biasing circuit 77 between the terminals G and K in series with the normally open contacts TR5 of the traverse right relay TR. The normally closed contacts TR4 of the traverse right relay bypass this aforementioned series combination. Connected across the shifting resistance 85 is the series combination of a traverse resistance 86 and the normally closed contacts V1 of the second timer V.

The speed reducing drive 43 is shown in isometric view in Figure 4 with a plurality of gears each of which is mounted on ball bearings; however, these ball bearings have not been shown in this figure in the interest of clarity of the figure. This speed reducing drive 43 is shown as having an input at 91 from the carriage motor 42 and an output at 92 to the lead screw 21 with first and second power trains 93 and 94 connected therebetween. The speed reducing drive 43, as shown, has a 160:1 speed reduction. The input 91 is connected to a first pinion 95 journaled on a first shaft 96. The pinion 95 meshes with a first gear 97 which is journaled on a second shaft 98. The first gear 97 is fixedly connected to a second pinion 99 which meshes with and drives a second gear 100 journaled on the first shaft 96. The second gear 100 is fixedly fastened to and drives a third pinion 101 which in turn meshes with and drives a third gear 102 journaled on the second shaft 98. The third gear is fixedly fastened to and drives a double ended overrunning male clutch member 103. The first and second power trains 93 and 94 split at the clutch 103 and the first power train 93 comprises a first female clutch member 104 which is adapted to be driven by the male clutch member 103 upon rotation of this latter member in a clockwise rotational direction thereof when Figure 3 is viewed from the lower left corner. The female clutch member 104 is fixedly connected to a fourth pinion 105 which in turn meshes with and drives a fourth gear 106 journaled on a third shaft 107. The fourth gear 106 is fixedly connected to and drives a fifth pinion 108 which in turn meshes with and drives a fifth gear 109 slidably keyed to a fourth shaft 110. The fourth shaft 110 is connected to the output 92 and hence the lead screw 21.

The second power train 94 comprises a second female clutch member 111 which is adapted to be driven from the male clutch member 103 upon rotation thereof in a counterclockwise direction as viewed from the lower left corner of this Figure 3. The female clutch member 111 is fixedly connected to and drives a sixth gear 112 which meshes with and drives an idler gear 113 journaled on a fifth shaft 114. This idler gear 113 meshes with and drives a seventh gear 115 which is directly connected to the fifth gear 109, which as previously stated, is slidably keyed to the output shaft 110. The fifth and seventh gears 109 and 115 are made slidable upon the fourth shaft 110 so that these gears may be engaged and disengaged from the pinion 108 and idler gear 113, respectively. The manual shift lever 44 is pivoted on a pivot 124 and has at the other end thereof a shifter yoke 116 engaging the fifth gear 109 for movement of the gears 109 and 115 longitudinally along the fourth shaft 110. The manual shift lever 44 has been shown in the engaged position and upon throwing the lever 44 to the left the shifter yoke 116 will swing to the right to thus disengage the fifth gear 109 and fifth pinion 108 and disengage the seventh gear 115 and idler gear 113. Since the output 92 is adapted to be connected to the lead screw 21 of the lathe by this shifting of the manual shift lever 44 to the left or disengaged position, the carriage motor 42 will be disengaged from the lead screw 21. A centering spring 117 is fastened to the male clutch member 103 and is fastened to a fixed bracket 118 so that this centering spring may act to physically center the male clutch member 103 and thus establish same in position for driving either of the female clutch members 104 or 111 upon appropriate rotational direction of the input 91.

The speed reducing drive 43 is mounted on a bracket 122 which may be fastened to the bed 11 of the lathe, and this bracket 122 also carries the rectifier 45 and the carriage motor 42. The fourth shaft 110 of the speed reducing drive 43, which is the output shaft thereof, is equipped with a coupling 123 for direct attachment to the right end of the lead screw 21. The manual shift lever 44 permits disconnection of the lead screw 21 from the carriage motor 42, and thus the engine lathe may be used in its customary manner by drive of the lead screw 21 from the spindle motor 19 through customary gear box. It may thus be seen that the package drive unit in no way affects the normal operation of the engine lathe.

The Figure 5 illustrates one of the ball bearing supports for the gears, namely, the shaft 96. A ball bearing 125 is mounted within a supporting wall 126 of the housing of the speed reducing drive 43. The shaft 96 is journaled in this ball bearing 125, and the pinion 101 is keyed to this shaft 96 by the key 127. Similar ball bearing supports are provided for the other shafts.

In the Figure 1 there is shown a control panel 119 on which are located the start and stop buttons 55 and 56 for the spindle motor 19. There may also be located on this control panel additional switches not shown in the circuit, such as those for reversing the spindle motor 19, an on-off selector switch for the package driving unit and an on-off selector switch for the coolant pump motor, not shown. Further, shown at the right of Figure 1 is a movable stand 120 which carries at the upper end thereof a control head 121. On this control head 121 are placed the feed meter 87, the control off-on switch 62, the start cycle switch 63, the stop cycle switch 66, and the reversing switch 65. Also on this control head 121 are placed the manual knobs for the plurality of feed potentiometers 82 for setting the rates of feed for each of the five positions of the stepping relay SR. The timer T is also placed on this control head 121 in order to adjust the interval of time before the contacts T1 close after the relay coil thereof is energized. An indicator light may also be placed on this control head to show when the control transformer 59 is energized.

*Operation.*—The lathe shown in Figure 1 may be a standard engine lathe which is capable of performing its numerous powered functions under manual control of an operator. Such an engine lathe would include a gear box and a gear selector lever for establishing different speeds to the spindle 12, would include powered movement of the carriage 16 by means of the lead screw 21 and would include powered movements of the cross slide 23 through the agency of the feed rod 22. Such powered movements would be effected by the operator through the conventional levers shown but not numbered on the engine lathe of Figure 1. The present invention relates to a separable package drive unit which may be installed upon such a standard engine lathe to convert same into an automatic cycle machine and retaining as much of the standard engine lathe components as is feasible to yet establish the new function of an automatic machine. The separable package unit would contain an adaptor unit to fixedly attach the hydraulic power unit 25 to the carriage 16, thus providing fluid under pressure for operation of the hydraulic servomotor shown as the cylinder 32. The package unit would also contain a new cross slide 23 upon which is mounted the pivot 29 carrying the top slide ways 30 and top slide 24. The top slide, as previously mentioned, carries the tool slide 33 and also carries the arm 37 with the tracer assembly 38. The back rail 17 and the holder for the pattern assembly 39 would also be included and preferably this pattern assembly has means, such as a screw and nut assembly, for shifting the pattern longitudinally relative to the axis of the spindle. The tool slide 33 shifts the tool transversely to the spindle axis, and thus the combination of this longitudinal and transverse shifting may be utilized to correctly position the tool and workpiece relative to the positions of the tracer assembly 38 and pattern assembly 39.

An automatic cycle of operation will now be explained with the aid of Figure 2. It will be observed that the right and left limit switches 46 and 47 are mounted on the carriage ways 15 and are adapted to be actuated by an abutment on the carriage 16. The feed varying switch 48 is mounted in the bottom of the apron of the carriage 16 and is actuated by the dogs 49 as the carriage is reciprocated. At the start of a cycle of operation, the tracer finger 38 would be in the position 38A shown in Figure 2, and the carriage would be in the rightmost position, hence, the right limit switch 46, as seen in Figure 3, would be actuated to the down position. The operator would press the start button 55 and the main relay M would thus be energized across the lines L2 and L3 with the contacts M1 holding in this main relay M after the start button 55 is released. The closing of the contacts M2, M3 and M4 would energize the spindle motor 19 and will also energize the leads 57 and 58 to energize the control transformer 59 and the rectifier 45. The operator would next make certain that the normal gear drives of the lead screw 21 and feed rod 22 are disconnected and the manual shift lever 44 is thrown to the engaged position to connect the lead screw 21 with the carriage motor 42. The operator would next turn the control switch 62 to the on position and press the start cycle button 63. The timer hold in relay TH and the timer relay T will then be energized with the timer hold in contacts TH1 closing to maintain these two relays energized even after release of the start cycle button 63. The hydraulic motor relay HM will also be energized and this closes the contacts HM1, HM2 and HM3 to start the hydraulic motor 34 and thus supply fluid under pressure from the pump 35 to the cylinder 32. The tracer finger will not be in contact with the pattern assembly 39, and hence the tracer assembly 38 will be in a condition which causes the top slide 24 to move inwardly. This top slide 24 may be adjusted by means of the pivot 29 to any angle relative to the spindle axis; however, it has been found that a 45-degree angle is most advantageous for performing a majority of machining operations. When the tracer assembly 38 reaches the pattern assembly 39 at the position 38B, the cooperation therebetween will establish a neutral condition for the hydraulic servomotor and hence the movement of the top slide 24 will cease in accordance with the well-known pattern and tracer control of machine tools. The timer T will be set to time out after the top slide 24 has ceased movement and upon timing out, the contacts T1 will close to energize the feed left relay FL. The contacts FL2 will open to open the dynamic braking circuit on the carriage motor 42, thus conditioning this motor for its running condition. The rectifier 45, having previously been energized, will have a rectified output across the leads 73 and 74, and since the contacts FL1 close, the carriage motor 42 will be energized to rotate in a forward direction through the contacts B1 and B2 to drive the carriage 16 leftwardly. The voltage output of the rectifier 45 across the leads 73 and 74 will be in accordance with the biasing voltage applied to the control terminals G and K. This biasing voltage will change as the carriage motor 42 comes up to speed since it drives the tachometer generator 78 to thus change the compounding voltage developed across the compensating potentiometer 80. Also in this biasing circuit 77 will be the lowermost feed potentiometer 82 since the contacts TR4 are closed and the contact blade 84 of the stepping relay SR is in its lowermost position. This lowermost of the feed potentiometers 82 would have been preset to establish the feed rate at the correct speed for that particular machining operation.

As the carriage 16 moves leftwardly with the tracer 38 moving through the positions 38C, 38D, 38E and 38F, the various trip dogs 49 will actuate the feed varying switch 48 and with each actuation the stepping relay SR will be actuated to establish another one of the feed potentiometers 82 in the electrical circuit arrangement of the biasing circuit 77. This may be used to step up the feed rate of the carriage 16 for the step shaft 40 shown as the workpiece in order to maintain substantially constant rate of material removal from the workpiece. It may be used also to slow down the feed rate for any given portion of the cycle in order to establish a smoother finish on that portion of the workpiece. Further, feed rates may be changed in order to effectively break up the chips of metal being removed. Such variations in feed are very advantageous in effecting a rapid work cycle which maintains a highly finished surface on those portions of the workpiece where it is needed and yet establishes the shortest elapsed time for a complete automatic cycle for a given workpiece. The carriage 16 upon reaching its leftward limit would actuate the left limit switch 47 which de-energizes the four relays, timer hold in, timer, feed left and hydraulic motor, and energizes the two relays traverse right and second timer V. The tracer 38 would then be in the position 38G. The de-energization of the feed left relay FL closes the contacts FL3 to energize the brake relay B, since by initial movement of the carriage 16 the right limit switch 46 has been deactuated to close the upper contacts thereof. The brake relay B upon energization closes the contacts B3 and B4 to thus condition the carriage motor 42 for dynamic braking and for reverse rotational direction. The energization of the traverse right relay TR closes the contacts TR3 as hold in contacts for the relays TR and V, opens the contacts TR2 to release the dynamic braking circuit on the carriage motor 42, and closes the contacts TR1 to thus energize this carriage motor 42 from the output of the rectifier 45. The de-energization of the hydraulic motor relay HM shuts off the hydraulic motor 34, and hence there is no fluid pressure to cause movement of the top slide 24, thus, the top slide 24 cannot move inwardly even though the tracer assembly 38 is conditioned to establish such inward movement. The contacts TR6 close to energize the reset coil 70 of the stepping relay SR to thus return the contact blade 84 thereof to the lowermost position to condition this stepping relay SR in a position for the next automatic cycle. The contacts TR4 will open and the contacts TR5 will close to thus place in the biasing circuit 77 the resistances 85 and 86. The combination of these two resistances establishes a bias which creates an output of the rectifier 45 so that the carriage motor 42 will rotate at a moderate or slow speed to thus aid in shifting the male clutch member 103 in the speed reducing drive 43.

The second timer V is set to time out in a short time after completion of the shifting of the male clutch member 103 and thus the bias established by the biasing circuit 77 will be changed to produce maximum output of the rectifier 45, and hence maximum rotational speed of the carriage motor 42. This shifting of the clutch member 103 changes the ratio of the speed reduction from its former 160:1 to a 32:1 ratio to permit the carriage motor 42 to rapidly traverse the carriage 16 to the right to its starting point, where the right limit switch 46 is actuated and where the tracer 38 will again resume its initial position 38A. The opening of the right limit switch 46 de-energizes the relays TR, V and B.

The de-energization of the traverse right relay TR closes the contacts TR2 to dynamically brake the carriage motor 42, aided by the fact that de-energization of the brake relay B has reversed the former running connections of the field 76 and armature 75.

The reversing switch 65 performs the same function as the left limit switch 47, and hence the automatic cycle may be stopped at any point during its leftward movement and the carriage 16 will rapidly traverse to the right to the starting point 38A. Further, the cycle may be stopped at any point in its leftward feeding movement by the opening of the stop cycle switch 66. This de-energizes the feed left relay FL which opens the contacts FL1 to de-energize the carriage motor 42. The contacts FL3 close to energize the brake relay B which reverses the field 76 relative to the armature 75 and the contacts FL2 close to thus establish the aforementioned dynamic braking circuit. The cut-out switch 69 may be thrown to the lower position which thus prevents the stepping relay SR from further energization and also bridges the contacts TR6 to continually energize the reset coil 70. The biasing circuit 77 will thus be biased only in accordance with the lowermost of the feed potentiometers 82.

The speed reducing drive 43 shown in Figure 4 includes the first and second power trains 93 and 94, as previously stated, with the first power train 93 being employed during forward rotational direction of the carriage motor 42. This means that during feed left of the carriage 16 the 160:1 gear reduction is employed and during the traverse right only the 32:1 gear reduction is employed. The centering spring 117 acts to physically center the male clutch member 103 so that upon forward rotation thereof the teeth on this clutch member will engage the female clutch member 103 and the mating teeth on the clutch members 103 and 111 will be cammed out of engagement. Conversely, when the carriage motor 42 is reversed for traverse right of the carriage 16, the clutch members 103 and 104 will be cammed out of engagement and this male clutch member 103 will engage the female clutch member 111.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A first motor connected for reciprocating a transverse slide under control of pattern and tracer devices, a second motor connected for reciprocating a longitudinal slide, and a control system for controlling both of said motors, said control system including, switch means positioned to be actuated by reciprocation of said longitudinal slide, first electromagnetic means having first and second conditions and controlling the operation of said longitudinal slide and actuated by said switch means to reverse the direction of reciprocation of said longitudinal slide and a second switch having an impedance in series therewith and first and second positions corresponding to the conditions of said first electromagnetic means, and second switch being actuated by said first electromagnetic means so that when in said first condition it establishes the rate of movement of said longitudinal slide at a maximum speed in one direction and in said second condition it establishes the rate of movement of said longitudinal slide at a lower speed in the other direction, and second electromagnetic means operated by the first condition of said first electromagnetic means to release the control of said first motor by said tracer device and render motionless said transverse slide and by the second condition of said first electromagnetic means to return the control of said first motor to said tracer device.

2. A first motor for reciprocating a slide under control of a pattern and tracer assembly, means operatively connecting said first motor to said slide, a second motor for reciprocating a carriage, means operatively connecting said second motor to said carriage, variable energization means connected for energizing said second motor, and a control system for controlling both of said motors, said control system including switch means positioned to be actuated by reciprocation of said carriage, first electromagnetic means having first and second conditions and controlling the operation of said energization means and actuated by said switch means to reverse the direction of rotation of said second motor and a second switch having an impedance in series therewith and first and second positions corresponding to the conditions of said first electromagnetic means, said second switch being actuated by said first electromagnetic means so that when in said first condition it establishes said second motor at the maximum speed thereof in one direction and in said second condition it establishes said second motor at a lower speed in the other direction, and second electromagnetic means operated by the first condition of said first electromagnetic means to release the control of said first motor by said tracer and by the second condition of said first electromagnetic means to return the control of said first motor to said tracer.

3. A first motor, a second motor, a first member moved by said first motor, a second member moved by said second motor in a different direction, one of said members carrying the other thereof for a compound movement, a pattern and tracer control having relative movement therebetween in accordance with said compound movement, a control system for controlling both of said motors, said control system including said pattern and tracer control for said first motor, first switch means positioned to be actuated by operation of said second motor, first electromagnetic means having first and second positions and controlling the operation of said second motor actuated by said first switch means to reverse the direction of operation of said second motor, a second switch having a resistance in series therewith and first and second positions corresponding to the positions of said first electromagnetic means, said second switch being actuated by said first electromagnetic means so that when in said first position it establishes the rate of movement of said second motor at a maximum speed in one direction and in said second position it establishes the rate of movement of said second motor at a lower speed in the other direction, and second electromagnetic means operated in the first position of said first electromagnetic means to release the control of said first motor from said pattern and tracer control and render motionless said first motor and in the second position of said first electromagnetic means to return the control of said first motor to said pattern and tracer control.

4. A first motor, a second motor, pattern and tracer control for said first motor, variable energization means connected for energizing said second motor, and a control system for controlling both of said motors, said control system including first switch means positioned to be actuated by operation of said second motor, first electromagnetic means having first and second positions and controlling the operation of said energization means and actuated by said first switch means to reverse the direction of rotation of said second motor, a second switch having a resistance in series therewith and first and second positions corresponding to the positions of said first electromagnetic means, said second switch being actuated by said first electromagnetic means so that when in said first position it establishes said second motor at the maximum speed thereof in one direction and in said second position it establishes said second motor at a lower speed in the other direction, and second electromagnetic means operated in the first position of said first electromagnetic means to release the control of said first motor by said pattern and tracer control and in the second position of said first electromagnetic means to return the control of said first motor to said pattern and tracer control.

References Cited in the file of this patent

UNITED STATES PATENTS

| Number | Name | Date |
|---|---|---|
| 1,166,126 | Gridley | Dec. 28, 1915 |
| 1,586,286 | Burt | May 25, 1926 |
| 1,711,290 | Shaw | Apr. 30, 1929 |
| 1,814,424 | Barr | July 14, 1931 |
| 2,036,073 | O'Hagan | Mar. 31, 1936 |
| 2,228,902 | Allen | Jan. 14, 1941 |
| 2,343,577 | Poorman | Mar. 7, 1944 |
| 2,402,450 | Salisbury | June 18, 1946 |
| 2,437,570 | Von Zelewsky | Mar. 9, 1948 |
| 2,450,096 | Siekmann | Sept. 28, 1948 |
| 2,475,326 | Johnson | July 5, 1949 |
| 2,512,008 | Bickel | June 20, 1950 |
| 2,540,323 | Cross | Feb. 6, 1951 |
| 2,557,860 | Bickel | June 19, 1951 |
| 2,558,275 | Siekmann | June 26, 1951 |
| 2,586,183 | Stewart | Feb. 19, 1952 |